United States Patent
Grant et al.

(10) Patent No.: US 6,661,216 B1
(45) Date of Patent: Dec. 9, 2003

(54) APPARATUS AND METHOD FOR CONTROLLING STARTUP OF A PRECHARGED SWITCHING REGULATOR

(75) Inventors: David A. Grant, Dallas, TX (US); David D. Briggs, Richardson, TX (US); Ayesha I. Mayhugh, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/227,942

(22) Filed: Aug. 26, 2002

(51) Int. Cl.[7] .................................................. G05F 1/58
(52) U.S. Cl. ........................ 323/282; 323/285; 323/901
(58) Field of Search ................................. 323/282, 284, 323/285, 901

(56) References Cited

U.S. PATENT DOCUMENTS

| | | | | |
|---|---|---|---|---|
| 4,016,461 A | * | 4/1977 | Roland | 361/18 |
| 5,216,586 A | * | 6/1993 | Saito | 363/49 |
| 5,955,873 A | * | 9/1999 | Maccarrone et al. | 323/314 |
| 5,998,977 A | * | 12/1999 | Hsu et al. | 323/272 |
| 6,552,517 B1 | * | 4/2003 | Ribellino et al. | 323/282 |

* cited by examiner

*Primary Examiner*—Bao Q. Vu
(74) *Attorney, Agent, or Firm*—W. Daniel Swayze, Jr.; W. James Brady; Frederick J. Telecky, Jr.

(57) ABSTRACT

An apparatus for presenting a regulated output at an output locus established at a precharge level includes: (a) an error indicator generating an error signal indicating difference between a reference signal and a sensed signal; (b) a pulse indicator coupled with the error indicator generating a pulse signal indicating difference between the error signal and a periodic signal; (c) a switching device responding to the pulse signal effecting coupling of the output locus with a first terminal or a second terminal depending upon whether the pulse signal is at a first level or a second level; and (d) a driver controller coupled with the pulse indicator and the switching device that provides a control signal to the switching device indicating at least one characteristic of the pulse signal. The switching device is operative or inoperative depending upon whether the control signal is in a first state or a second state.

12 Claims, 4 Drawing Sheets

APPARATUS AND METHOD FOR CONTROLLING STARTUP OF A PRECHARGED SWITCHING REGULATOR

BACKGROUND OF THE INVENTION

The present invention is directed to switching regulator apparatuses, and especially to switching regulator apparatuses with outputs precharged substantially equal with or less than the rated output signal level of the regulator apparatus.

In certain applications in which switching regulator apparatuses are employed the output voltage of the regulator is precharged to a voltage greater than zero but less than the target or rated output voltage. In a typical situation involving startup of switching regulators, the output of the regulator apparatus operates according to a soft start voltage that increases from zero to a level desired for output regulation, i.e., the regulated or rated output voltage. Output loci at which the output voltage is presented by the apparatus are sometimes required to be precharged in order to meet certain specifications of devices using the regulator apparatus. One example of such a requirement of a precharging of an output locus of a switching regulator is when such a regulator is employed in providing power sequencing for a DSP (Digital Signal Processor) device. Soft start voltages and precharged output loci are used in startup sequences for such devices to preclude damage to the DSP.

If the output locus is precharged, or prebiased, to a voltage greater than zero but less than the rated output voltage, then during startup of the regulator a large current may flow from the output locus through at least a portion of the regulator apparatus. Such a "reverse current flow" into and through at least a portion of the regulator may damage internal components within the regulator. Such a "reverse current flow" may also be described as current sinking to the regulator. The resultant damage may render the regulator inoperative, or may contribute to decreased reliability in future operation of the regulator. Likelihood of decreased reliability is exacerbated if the regulator is subjected to repeated instances of such current sinking.

There is a need for an apparatus and method for controlling startup of a precharged switching regulator that precludes current sinking to the regulator.

SUMMARY OF THE INVENTION

An apparatus for presenting a regulated output at an output locus established at a precharge level includes: (a) an error indicator generating an error signal indicating difference between a reference signal and a sensed signal; (b) a pulse indicator coupled with the error indicator generating a pulse signal indicating difference between the error signal and a periodic signal; (c) a switching device responding to the pulse signal effecting coupling of the output locus with a first terminal or a second terminal depending upon whether the pulse signal is at a first level or a second level; and (d) a driver controller coupled with the pulse indicator and the switching device that provides a control signal to the switching device indicating at least one characteristic of the pulse signal. The switching device is operative or inoperative depending upon whether the control signal is in a first state or a second state.

A method for controlling startup of a precharged switching regulator apparatus includes the steps of: (A) In no particular order, (1) Providing a switched regulator apparatus configured for presenting a substantially regulated output signal at an output locus. The output locus is established at a precharge level less than the regulated output signal. The switched regulator apparatus includes: [a] an error indicator device that generates an error signal indicating a first difference between a reference signal and a sensed signal; [b] a pulse indicator device coupled with the error indicator device and generating a pulse signal indicating a second difference between the error signal and a periodic reference signal; and [c] a switching device coupled with the pulse indicator device and responding to the pulse signal to effect switched coupling of the output locus with a first terminal when the pulse signal is at a first signal level, and to effect switched coupling of the output locus with a second terminal when the pulse signal is at a second signal level. (2) Providing a driver control device coupled with the pulse indicator device and the switching device. The driver control device provides a control signal to the switching device indicating at least one characteristic of the pulse signal. The switching device responds to the control signal. The switching device is in an inoperative condition when the control signal is in a first state and is in an operative condition when the control signal is in a second state. (3) Establishing the control signal in the first state to place the switching device in the inoperative state. The method includes the further steps of: (B) Commencing a startup sequence for the apparatus. (C) Sampling the pulse signal. (D) Determining whether a pulse signal is extant. (E) If no pulse signal is extant, repeating steps (C) through (D). (F) If a pulse signal is extant, determining whether a predetermined criteria has been met. (G) If the predetermined criteria has not been met, repeating steps (C) through (F). (H) If the predetermined criteria has been met, establishing the control signal in the second state to place the switching device in the operative state. (I) Terminating the startup sequence.

It is, therefore, an object of the present invention to provide an apparatus and method for controlling startup of a precharged switching regulator that precludes current sinking to the regulator.

Further objects and features of the present invention will be apparent from the following specification and claims when considered in connection with the accompanying drawings, in which like elements are labeled using like reference numerals in the various Figures, illustrating the preferred embodiments of the invention.

DETAILED DESCRIPTION OF THE PREFERRED EMBODIMENT

Figure 1:
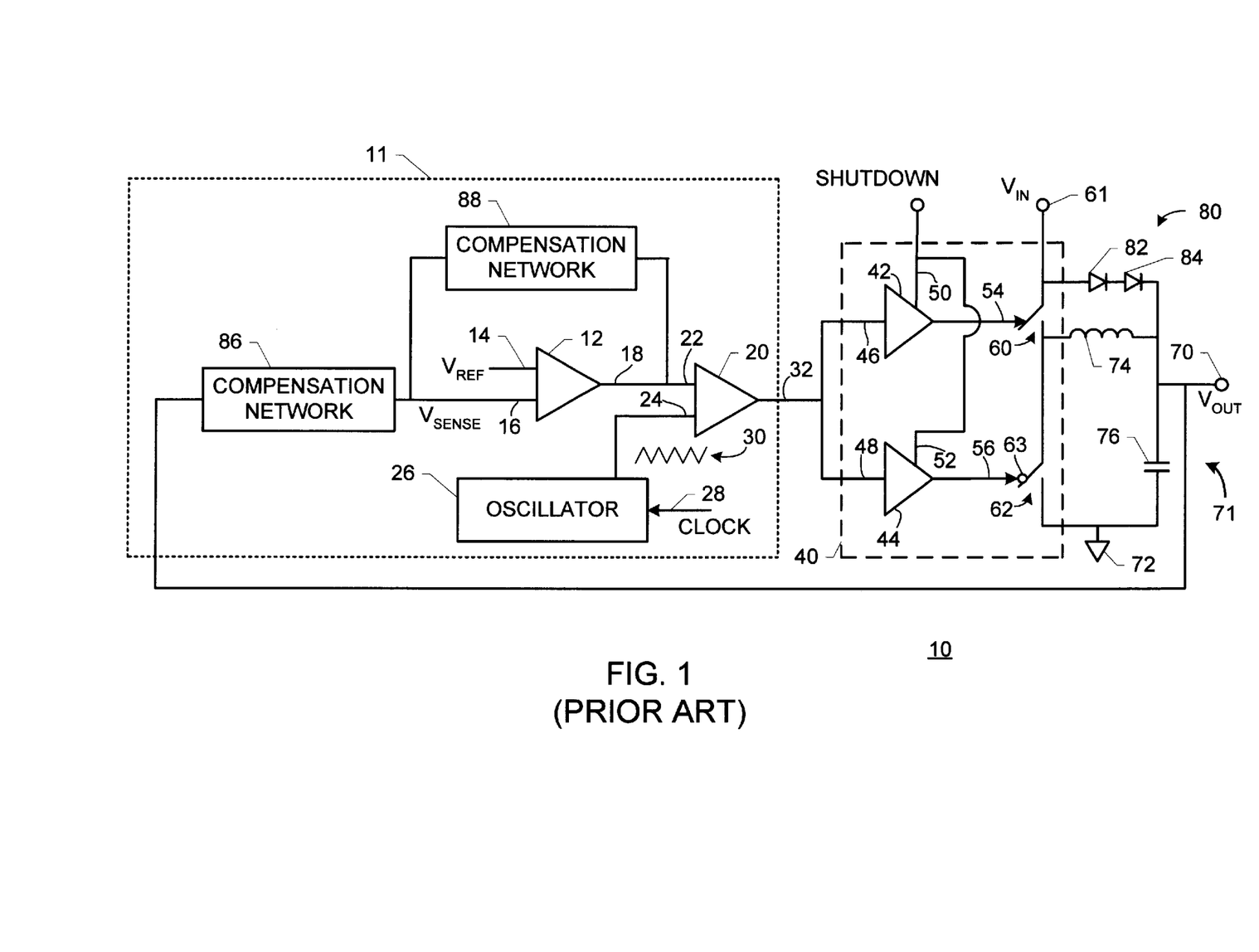
FIG. 1 is an electrical schematic diagram illustrating a prior art switched regulator apparatus.

FIG. 1 is an electrical schematic diagram illustrating a prior art switched regulator apparatus. In FIG. 1, a regulator apparatus 10 includes a difference-indicating unit 11, a switching unit 40, and an output unit 71. Difference-indicating unit 11 may be embodied in any unit that generates a pulse signal that represents difference between an extant signal at an output locus and a desired signal at that output locus. One example of such a pulse signal is a pulse width modulated signal having a duty cycle that represents the error between an extant signal at an output locus and a desired signal at that output locus. In the exemplary embodiment of difference-indicating unit 11 illustrated in FIG. 1, difference-indicating unit 11 includes an error amplifier unit, or device 12 receiving a reference signal $V_{REF}$ at a reference terminal 14, and receiving a sense signal $V_{SENSE}$ at a sense terminal 16. Error amplifier 12 generates an ERROR signal at an error output or error locus 18. The ERROR signal represents the difference between reference signal $V_{REF}$ and sense signal $V_{SENSE}$.

Regulator apparatus 10 further includes a pulse comparator unit or device, also sometimes described as a pulse width modulation comparator 20. Pulse comparator unit 20 receives the ERROR signal from error locus 18 at an input terminal 22. Pulse comparator unit 20 also receives a periodic reference signal at an input terminal 24 from a periodic signal source 26. Preferably, periodic signal source 26 is embodied in an oscillator that receives a clock signal at a clock terminal 28 and generates a periodic signal preferably in the form of a "sawtooth" signal, as indicated generally by a waveform 30. Pulse comparator unit 20 generates a PULSE signal at a pulse signal locus 32 that represents the difference between the ERROR signal received at terminal 22 and the periodic reference signal received at terminal 24.

Pulse signal locus 32 is coupled with a switching unit 40. Switching unit 40 includes a high side switching FET (Field Effect Transistor) driver 42 and a low side switching FET driver 44. FET driver 42 has an input terminal 46 that is connected with pulse signal locus 32 so that FET driver 42 receives the PULSE signal from pulse signal locus 32 as an input signal. FET driver 44 has an input terminal 48 that is connected with pulse signal locus 32 so that FET driver 44 also receives the PULSE signal from pulse signal locus 32 as an input signal. FET drivers 42, 44 are established in an operative condition or in an inoperative condition in response to a SHUTDOWN signal applied at control terminals 50, 52. FET drivers 42, 44 produce switching output signals at output lines 54, 56 in response to signals received at input terminals 46, 48. Output line 54 is coupled with a switch 60. Switch 60 operates in response to high switching output signals on output line 54 by closing to connect an input locus 61 with ground 72 in a circuit including an inductor 74 and a capacitor 76. An input signal $V_{IN}$ is provided at input locus 61. Inductor 74 and capacitor 76 represent impedance of a load coupled with an output locus 70. Thus, closing switch 60 results in output locus 70 being established at a potential substantially equal with input signal $V_{IN}$. Switch 62 is configured with an inverter 63. Thus, switch 62 operates in response to low switching output signals on output line 56 by closing to connect ground 72 with output locus 70 in a circuit including inductor 74 and capacitor 76. Closing switch 62 results in output locus 70 being established at a potential substantially equal with ground 72. Switching FET drivers 42, 44 and switches 60, 62 may be configured in any of several manners so that switches 60, 62 cannot be in the same state at the same time. That is, either switch 60 is open and switch 62 is closed, or switch 60 is closed and switch 62 is open. Such various connection arrangements may include providing an inverter at either of FET drivers 42, 44; providing an inverter at either of switches 60, 62 (as illustrated in FIG. 1) or another arrangement. Switches 60, 62 are preferably embodied in FETs.

A voltage drop device 80, illustrated in FIG. 1 in its preferred embodiment as comprising series-connected diodes 82, 84, is coupled between input locus 61 and output locus 70. Voltage drop device 80 may be configured by another arrangement that provides the desired voltage to output locus 70 including, by way of example and not by way of limitation, a greater number or lesser number of diodes, any number of diode-connected transistor devices, a separate power source for output locus 70, or another arrangement. It is this connection by voltage drop device 80 that establishes a precharge potential to output locus 70 that is required in some applications employing regulator apparatus 10, such as in circuits involving power sequencing, or power management for DSP (Digital Signal Processor) devices.

Output locus 70 is coupled with sense terminal 16 of error amplifier 12 via a compensation network 86. Another compensation network 86 establishes a feedback circuit for error amplifier 12 between error locus 18 and sense terminal 16. Compensation networks 86, 88 set circuit parameters for ensuring proper operation of error amplifier 12 in regulator 12, as can be understood by one skilled in the art of switched regulator design. Details of compensation networks 86, 88 are omitted here in order to simplify explaining the present invention.

Figure 2:
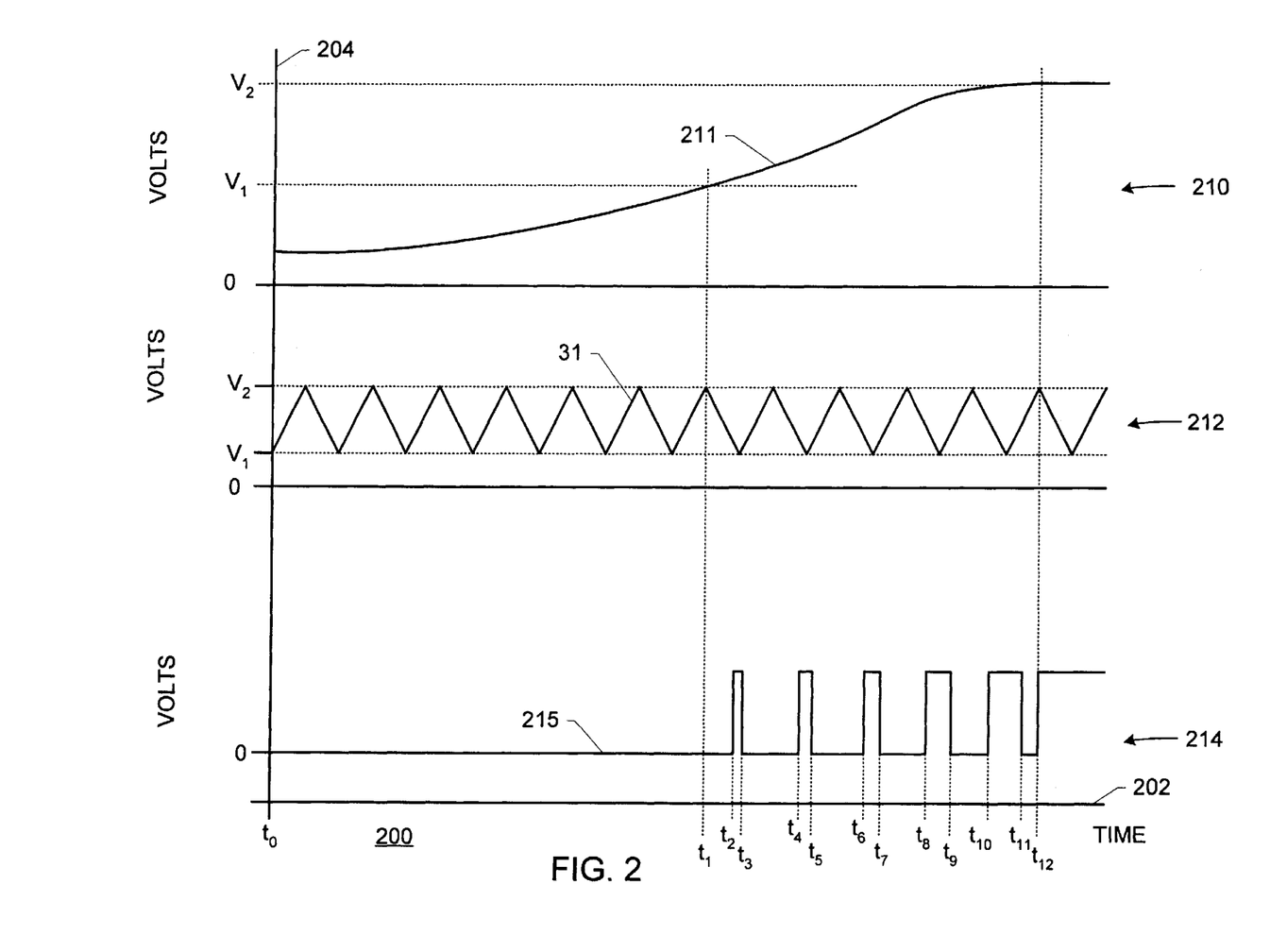
FIG. 2 is a graphical representation of selected waveforms associated with operation of the switched regulator apparatus illustrated in FIG. 1.

FIG. 2 is a graphical representation of selected waveforms associated with operation of the switched regulator apparatus illustrated in FIG. 1. In FIG. 2, a graphic plot 200 presents an axis 202, indicating elapsed time, and an axis 204, representing volts. A curve 210 represents an ERROR signal 211 such as the ERROR signal that is presented at error locus of regulator apparatus 10 (FIG. 1). ERROR signal 211 starts from a value at or near zero volts at a time $t_0$ and rises to a value of substantially $V_2$ volts substantially at a time $t_{12}$.

A curve 212 represents a periodic reference signal 31 such as sawtooth signal 30 presented at sense terminal 16 of error amplifier 12 (FIG. 1). Periodic reference signal 31 varies between values $V_1$, $V_2$ between times $t_0$, $t_{12}$.

A curve 214 represents a PULSE signal 215 such as the PULSE signal that is presented at pulse signal locus 32 of regulator apparatus 10 (FIG. 1). PULSE signal 215 goes high whenever error signal 211 is greater than periodic reference signal 31, as occurs in FIG. 2 at times $t_2$, $t_4$, $t_6$, $t_8$, $t_{10}$, $t_{12}$. Whenever ERROR signal 211 is less than periodic reference signal 31, PULSE signal 215 goes low, as occurs in FIG. 2 at times $t_3$, $t_5$, $t_7$, $t_9$, $t_{11}$. ERROR signal 211 changes or varies at a significantly slower rate that periodic reference signal 31 (FIG. 2 is not to scale). Accordingly, the high portions of PULSE signal 215 are of longer duration with each successive occurrence. The high portions of PULSE signal 215 are regarded as pulses, and occur in FIG. 2 during pulse intervals $t_2$–$t_3$, $t_4$–$t_5$, $t_6$–$t_7$, $t_8$–$t_9$, $t_{10}$–$t_{11}$, and for an undetermined time interval (in FIG. 2) after time $t_{12}$.

Voltage values $V_1$ and $V_2$ establish the operational range of an error amplifier such as error amplifier 12 and a pulse comparator unit such as pulse comparator unit 20 (FIG. 1). Accordingly, PULSE signal 215 will remain at its low value at least during times that ERROR signal 31 is below operating voltage $V_1$, as occurs during time interval $t_0$–$t_1$ in FIG. 2.

FET drivers in a switching regulator apparatus such as FET drivers 42, 44 in regulator apparatus 10 (FIG. 1) respond to a PULSE signal such as PULSE signal 215 (FIG. 2). During a pulse interval $t_2$–$t_3$, $t_4$–$t_5$, $t_6$–$t_7$, $t_8$–$t_9$, $t_{10}$–$t_{11}$ high side FET driver 42 and switch 60 cooperate to close switch 60 and low side FET driver 44 and switch 62 do not operate to close switch 62, so switch 62 remains open. When PULSE signal 215 is not in a pulse interval, that is when PULSE signal 215 is low, low side FET driver 44 cooperates with switch 62 to close switch 62 and high side FET driver 42 and switch 60 do not operate to close switch 60, so switch 60 remains open.

A problem arises with prior art regulator apparatus 10 (FIG. 1) during a startup sequence when output locus 70 is precharged. During a startup sequence, PULSE signal 215 begins at its low value, such as at zero volts as indicated during time interval $t_0$–$t_2$ in FIG. 2. As discussed above, PULSE signal 215 will be at its low value at least during time interval $t_0$–$t_1$ while ERROR signal rises to operational voltage $V_1$. In FIG. 2, during time interval $t_0$–$t_2$ ERROR signal 211 is lower than periodic reference signal 31 so PULSE signal 215 is low. Low side FET driver 44 operates in cooperation with switch 62 in response to PULSE signal 215 being low to establish switch 62 in a closed position, and switch 60 is open. If during time interval $t_0$–$t_2$ voltage drop device 80 applies a potential to output locus 70 in regulator apparatus 10 (FIG. 1) that is less than input voltage $V_{IN}$ (as will occur during a startup sequence), there is a likelihood that current will flow from output locus 70 through at least a portion of regulator apparatus 10. Such a "reverse current flow" into and through at least a portion of regulator apparatus 10 may damage internal components within regulator apparatus 10. Such a "reverse current flow" may also be described as current sinking to regulator apparatus 10. The resultant damage may render regulator apparatus 10 inoperative, or may contribute to decreased reliability in future operation of regulator apparatus 10. Likelihood of decreased reliability is exacerbated if the regulator is subjected to repeated instances of such current sinking.

The present invention provides an apparatus and method for controlling startup of a precharged switching regulator that precludes current sinking to the regulator. The solution is embodies in a low cost apparatus (and use of the apparatus) to disable current sinking by suppressing operation by a switching unit (e.g., switching unit 40) during at least a portion of a startup sequence for a regulator apparatus (e.g., regulator apparatus 10; FIG. 1).

Figure 3:
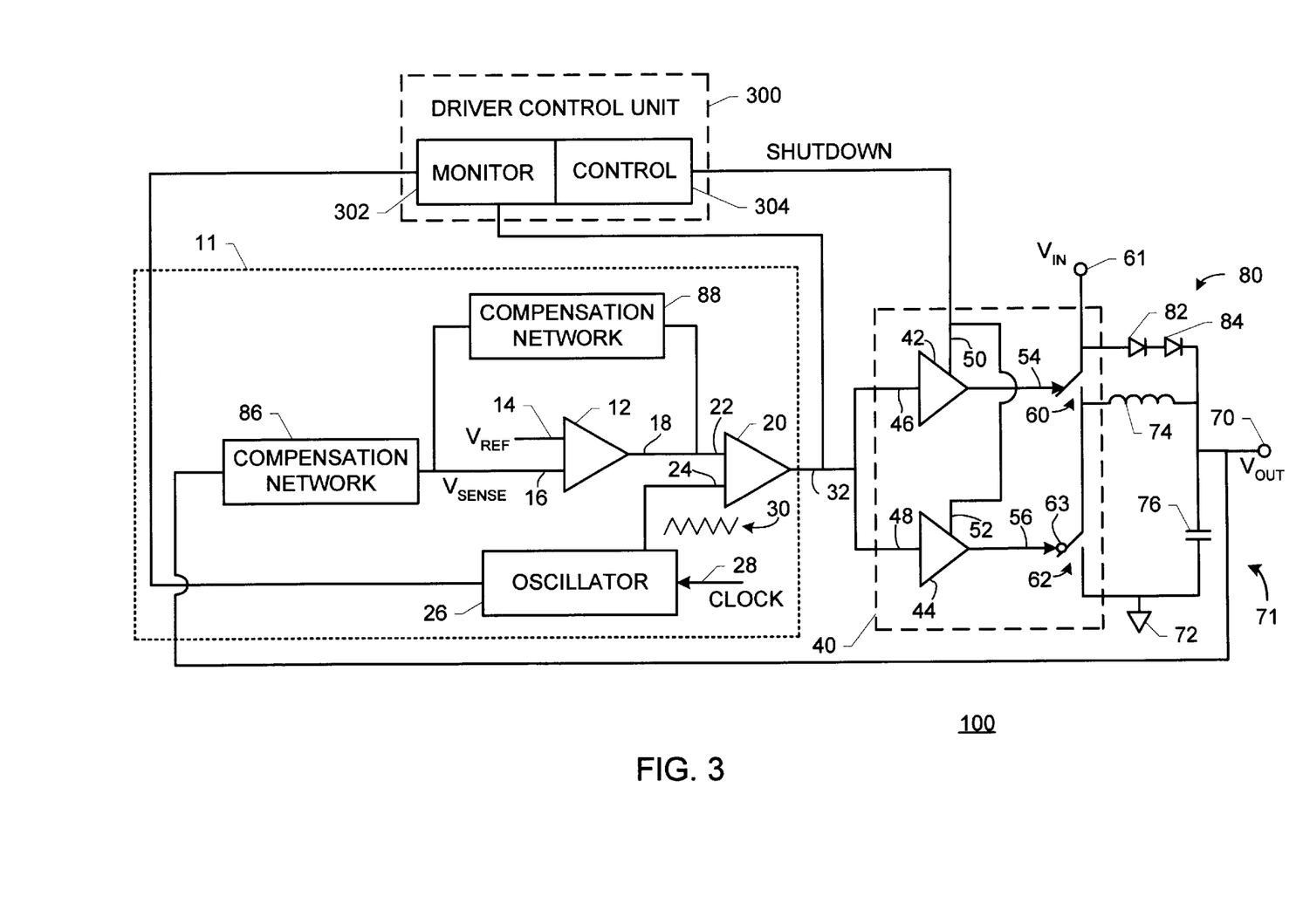
FIG. 3 is an electrical schematic diagram illustrating a switched regulator apparatus according to the present invention.

FIG. 3 is an electrical schematic diagram illustrating a switched regulator apparatus according to the present invention. In FIG. 3, a regulator apparatus 100 includes several components arranged in a configuration substantially similar to regulator apparatus 10 (FIG. 1). Components in regulator apparatus 100 that are substantially similar to components in regulator apparatus 10 are indicated with similar reference numerals in FIG. 3. Regulator apparatus 100 includes a difference-indicating unit 11, a switching unit 40, and an output unit 71. Difference-indicating unit 11 may be embodied in any unit that generates a pulse signal that represents difference between an extant signal at an output locus and a desired signal at that output locus. One example of such a pulse signal is a pulse width modulated signal having a duty cycle that represents the error between an extant signal at an output locus and a desired signal at that output locus. In the exemplary embodiment of difference-indicating unit 11 illustrated in FIG. 3, difference-indicating unit 11 includes an error amplifier unit, or device 12 receiving a reference signal $V_{REF}$ at a reference terminal 14, and receiving a sense signal $V_{SENSE}$ at a sense terminal 16. Error amplifier 12 generates an ERROR signal at an error output or error locus 18. The ERROR signal represents the difference between reference signal $V_{REF}$ and sense signal $V_{SENSE}$.

Regulator apparatus 10 further includes a pulse comparator unit or device, also sometimes described as a pulse width modulation comparator 20. Pulse comparator unit 20 receives the ERROR signal from error locus 18 at an input terminal 22. Pulse comparator unit 20 also receives a periodic reference signal at an input terminal 24 from a periodic signal source 26. Preferably, periodic signal source 26 is embodied in an oscillator that receives a clock signal at a clock terminal 28 and generates a periodic signal preferably in the form of a "sawtooth" signal, as indicated generally by a waveform 30. Pulse comparator unit 20 generates a PULSE signal at a pulse signal locus 32 that represents the difference between the ERROR signal received at terminal 22 and the periodic reference signal received at terminal 24.

Pulse signal locus 32 is coupled with a switching unit 40. Switching unit 40 includes a high side switching FET (Field Effect Transistor) driver 42 and a low side switching FET driver 44. FET driver 42 has an input terminal 46 that is connected with pulse signal locus 32 so that FET driver 42 receives the PULSE signal from pulse signal locus 32 as an input signal. FET driver 44 has an input terminal 48 that is connected with pulse signal locus 32 so that FET driver 44 also receives the PULSE signal from pulse signal locus 32 as an input signal. FET drivers 42, 44 are established in an operative condition or in an inoperative condition in response to a SHUTDOWN signal applied at control terminals 50, 52. FET drivers 42, 44 produce switching output signals at output lines 54, 56 in response to signals received at input terminals 46, 48. Output line 54 is coupled with a switch 60. Switch 60 operates in response to high switching output signals on output line 54 by closing to connect an input locus 61 with ground 72 in a circuit including an inductor 74 and a capacitor 76. An input signal $V_{IN}$ is provided at input locus 61. Inductor 74 and capacitor 76 represent impedance of a load coupled with an output locus 70. Thus, closing switch 60 results in output locus 70 being established at a potential substantially equal with input signal $V_{IN}$. Switch 62 is configured with an inverter 63. Thus, switch 62 operates in response to low switching output signals on output line 56 by closing to connect ground 72 with output locus 70 in a circuit including inductor 74 and capacitor 76. Closing switch 62 results in output locus 70 being established at a potential substantially equal with ground 72. Switching FET drivers 42, 44 and switches 60, 62 may be configured in any of several manners so that switches 60, 62 cannot be in the same state at the same time. That is, either switch 60 is open and switch 62 is closed, or switch 60 is closed and switch 62 is open. Such various connection arrangements may include providing an inverter at either of FET drivers 42, 44; providing an inverter at either of switches 60, 62 (as illustrated in FIG. 3) or another arrangement. Switches 60, 62 are preferably embodied in FETs.

A voltage drop device 80, illustrated in FIG. 3 in its preferred embodiment as comprising series-connected diodes 82, 84, is coupled between input locus 61 and output locus 70. Voltage drop device 80 may be configured by another arrangement that provides the desired voltage to output locus 70 including, by way of example and not by way of limitation, a greater number or lesser number of diodes, any number of diode-connected transistor devices, a separate power source for output locus 70, or another arrangement. It is this connection by voltage drop device 80 that establishes a precharge potential to output locus 70 that is required in some applications employing regulator apparatus 10, such as in circuits involving power sequencing, or power management for DSP (Digital Signal Processor) devices.

Output locus 70 is coupled with sense terminal 16 of error amplifier 12 via a compensation network 86. Another compensation network 86 establishes a feedback circuit for error amplifier 12 between error locus 18 and sense terminal 16. Compensation networks 86, 88 set circuit parameters for ensuring proper operation of error amplifier 12 in regulator 12, as can be understood by one skilled in the art of switched regulator design. Details of compensation networks 86, 88 are omitted here in order to simplify explaining the present invention.

Regulator apparatus 100 further includes a driver control unit or device 300. Driver control device 300 includes a monitor unit 302 and a control unit 304. Monitor unit 302 is coupled with pulse signal locus 32 for monitoring signal levels or other appropriate parameters related with PULSE signals generated by pulse comparator unit 20. Control unit 304 is coupled with control terminals 50, 52 for FET drivers 42, 44. Driver control device 300 is preferably also coupled with periodic signal source 26 for ensuring that driver control device 300 operates in synchrony with periodic reference signal 30.

Driver control device 300 employs monitor unit 302 to sample PULSE signals appearing at pulse signal locus 32 to detect when a PULSE signal appears at pulse signal locus 32. When a PULSE signal is detected at signal locus 32, as when ERROR signal 211 exceeds periodic reference signal 31 (FIG. 2), then monitor unit 302 determines whether a predetermined criteria or condition has been met or satisfied. Examples of such criteria or conditions include, by way of example and not by way of limitation, the mere fact that a PULSE signal is present at pulse signal locus 32, or that pulses extant at pulse signal locus 32 have at least a minimum duration, or that pulses extant at pulse signal locus 32 exhibit at least a duty cycle of a specified amount (e.g., a 95% duty cycle).

Once monitor unit determines that PULSE signals are present at pulse signal locus 32 that meet at least one predetermined criteria, monitor unit 302 and control unit 304 cooperate to release or interrupt the SHUTDOWN signal provided to control terminals 50, 52 for FET drivers 42, 44. Thereafter, regulator apparatus 10 may operate substantially as described earlier in connection with regulator apparatus 10 (FIG. 1).

By way of example and not by way of limitation, predetermined criteria for permitting release or interruption of the SHUTDOWN signal may include: detecting presence of any PULSE signal at all at pulse signal locus 32, detecting presence of a PULSE signal at pulse signal locus 32 that has a duty cycle of at least a predetermined minimum amount, detecting a PUSE signal at pulse signal locus 32 that has demonstrated some repetitive pulsing and has settled to a constant signal level at the high PULSE signal level, or another criteria. An important design consideration is to ensure that the at least one predetermined criteria determining when the SHUTDOWN signal may be terminated by driver control unit 300 must be selected to ensure that sense signal $V_{SENSE}$ at sense terminal 16 is sufficiently high to ensure that an ERROR signal presented at error locus 18 is sufficiently high to result in a PULSE signal being presented at pulse signal locus 32 having sufficient duration to ensure that internal voltages within regulator apparatus 100 are appropriate to ensure that voltage present at output locus 70 will regulate properly. Most preferably output locus 70 should be substantially at regulated voltage $V_{IN}$ before the SHUTDOWN signal is interrupted by driver control unit 30. By ensuring such a relatively high potential within regulator apparatus 100 with respect to output locus 70, current sinking to regulator apparatus 100 may be precluded. Driver control unit 300 is preferably configured as a digital circuit.

Figure 4:
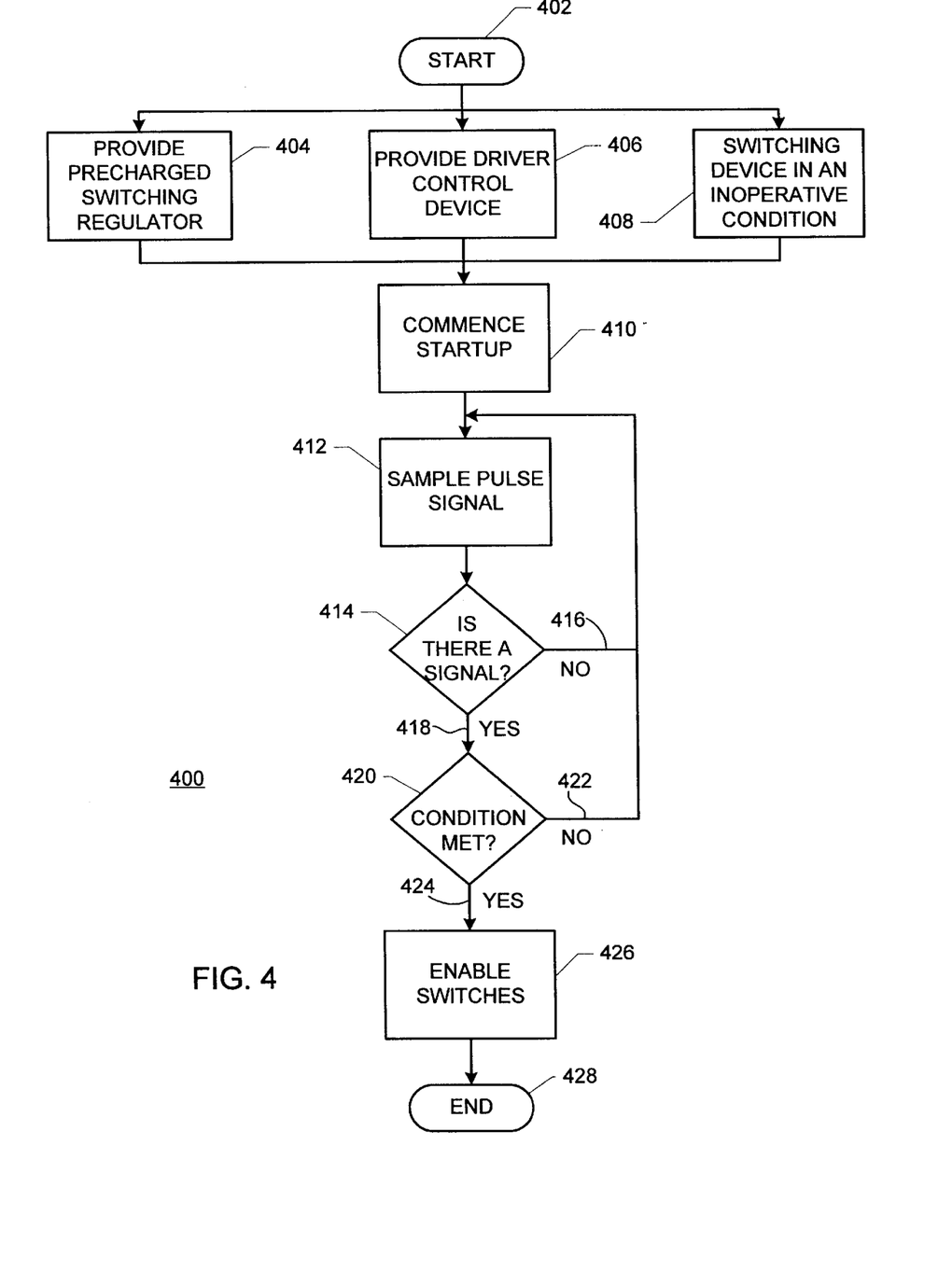
FIG. 4 is a flow diagram illustrating the preferred embodiment of the method of the present invention.

FIG. 4 is a flow diagram illustrating the preferred embodiment of the method of the present invention. In FIG. 4, a method 400 for controlling startup of a precharged switching regulator apparatus begins at a START locus 402. Method 400 continues by, in no particular order, providing a switched regulator apparatus, as indicated by a block 404; providing a driver control device, as indicated by a block 406; and orienting the switching device in the switching regulator in an inoperative condition, as indicated by a block 408.

The switching regulator apparatus (block 404) is configured for presenting a substantially regulated output signal at an output locus. The output locus is established at a precharge level less than the regulated output signal. The switched regulator apparatus includes: (1) an error indicator device that generates an error signal indicating a first difference between a reference signal and a sensed signal; (2) a pulse indicator device coupled with the error indicator device that generates a pulse signal indicating a second difference between the error signal and a periodic reference signal; and (3) a switching device coupled with the pulse indicator device that responds to the pulse signal to effect switched coupling of the output locus with a first terminal when the pulse signal is at a first signal level, and to effect switched coupling of the output locus with a second terminal when the pulse signal is at a second signal level.

The driver control device (block 406) is coupled with the pulse indicator device and the switching device. The driver control device provides a control signal to the switching device indicating at least one characteristic of the pulse signal. The switching device responds to the control signal. The switching device is in an inoperative condition when the control signal is in a first state and is in an operative condition when the control signal is in a second state.

The control signal is established in the first state to place the switching device in the inoperative state (block 408).

Method 400 continues by commencing a startup sequence for the apparatus, as indicated by a block 410. Method 400 continues further by sampling the pulse signal, as indicated by a block 412.

Method 400 continues by determining whether a pulse signal is extant, as indicated by a query block 414. If no pulse signal is extant, method 400 proceeds according to NO response line 416 and returns to repeat steps indicated by blocks 412, 414. If a pulse signal is extant, method 400 proceeds according to YES response line 418 to determine whether a predetermined at least one criteria has been met, as indicated by a query block 420. If the predetermined at least one criteria has not been met, method 400 proceeds according to NO response line 422 and returns to repeat steps indicated by blocks 412, 414, 420. If the predetermined at least one criteria has been met, method 400 proceeds according to YES response line 424 to establish the control signal in the second state to place the switching device in the operative state, as indicated by a block 426. Method 400 proceeds thereafter by terminating the startup sequence, as indicated by an END locus 428.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

What is claimed is:

1. An apparatus for generating an output signal at an output locus substantially at a regulated voltage; said output locus being established at a precharge voltage less than said regulated voltage prior to startup of the apparatus; the apparatus comprising:
   (a) a difference-indicating unit; said difference-indicating unit being coupled with said output locus and generating a pulse signal at a pulse signal locus; said pulse signal representing difference between an extant signal at said output locus and said regulated voltage;
   (c) a switching unit coupled with said pulse signal locus; said switching unit responding to said pulse signal to effect switched coupling of said output locus with a first terminal when said pulse signal is at a first signal level and to effect switched coupling of said output locus with a second terminal when said pulse signal is at a second signal level; and
   (d) a driver control unit coupled with said pulse signal locus and with said switching unit; said driver control unit applying a control signal to said switching unit; said control signal preventing said switching unit effecting said switched coupling when said control signal is at a first value; said control signal permitting said switching unit effecting said switched coupling when said control signal is at a second value; said driver control unit monitoring said pulse signal to detect presence of a pulse signal at said pulse signal locus; said driver control unit responding to detecting said pulse signal satisfying at least one predetermined condition to change said control signal from one value of said first value and said second value to the other value of said first value and said second value.

2. An apparatus for generating an output signal at an output locus substantially at a regulated voltage as recited in claim 1 wherein said driver control unit includes a monitor unit and a control unit; said monitor unit effecting said monitoring said pulse signal to detect presence of a pulse signal at said pulse signal locus; said control unit cooperating with said monitor unit for effecting said change of said control signal.

3. An apparatus for generating an output signal at an output locus substantially at a regulated voltage as recited in claim 1 wherein said driver control unit is embodied in a digital electronic circuit.

4. An apparatus for generating an output signal at an output locus substantially at a regulated voltage as recited in claim 2 wherein said driver control unit is embodied in a digital electronic circuit.

5. An apparatus for presenting a substantially regulated output signal at an output locus;
   said output locus being established at a precharge level substantially equal with or less than said regulated output signal; the apparatus comprising:
   (a) an error indicator device; said error indicator device generating an error signal indicating a first difference between a reference signal and a sensed signal;
   (b) a pulse indicator device coupled with said error indicator device and generating a pulse signal indicating a second difference between said error signal and a periodic reference signal;
   (c) a switching device coupled with said pulse indicator device and responding to said pulse signal to effect switched coupling of said output locus with a first terminal when said pulse signal is at a first signal level, and to effect switched coupling of said output locus with a second terminal when said pulse signal is at a second signal level; and
   (d) a driver control device coupled with said pulse indicator device and said switching device; said driver control device providing a control signal to said switching device indicating at least one characteristic of said pulse signal; said switching device responding to said control signal; said switching device being inoperative when said control signal is in a first state and being operative when said control signal is in a second state.

6. An apparatus for presenting a substantially regulated output signal at an output locus as recited in claim 5 wherein said driver control device includes a monitor unit and a control unit; said monitor unit receiving an indication of said pulse signal from said pulse indicator device; said control unit cooperating with said monitor unit to generate said control signal according to whether said pulse signal satisfies at least one predetermined criteria.

7. An apparatus for presenting a substantially regulated output signal at an output locus as recited in claim 5 wherein said driver control device is embodied in a digital electronic circuit.

8. An apparatus for presenting a substantially regulated output signal at an output locus as recited in claim 6 wherein said driver control device is embodied in a digital electronic circuit.

9. A method for controlling startup of a precharged switching regulator apparatus; the method comprising the steps of:
   (a) in no particular order:
      (1) providing a switched regulator apparatus configured for presenting a substantially regulated output signal at an output locus; said output locus established at a precharge level less than said regulated output signal; said switched regulator apparatus including:
         [a] an error indicator device; said error indicator device generating an error signal indicating a first difference between a reference signal and a sensed signal;
         [b] a pulse indicator device coupled with said error indicator device and generating a pulse signal indicating a second difference between said error signal and a periodic reference signal; and
         [c] a switching device coupled with said pulse indicator device and responding to said pulse signal to effect switched coupling of said output locus with a first terminal when said pulse signal is at a first signal level, and to effect switched coupling of said output locus with a second terminal when said pulse signal is at a second signal level;
      (2) providing a driver control device coupled with said pulse indicator device and said switching device; said driver control device providing a control signal to said switching device indicating at least one characteristic of said pulse signal; said switching device responding to said control signal; said switching device being in an inoperative condition when said control signal is in a first state and being in an operative condition when said control signal is in a second state; and
      (3) establishing said control signal in said first state to place said switching device in said inoperative state;
   (b) commencing a startup sequence for the apparatus;
   (c) sampling said pulse signal;
   (d) determining whether a pulse signal is extant;
   (e) if no pulse signal is extant, repeating steps (c) through (d);

(f) if a pulse signal is extant, determining whether at least one predetermined criteria has been met;

(g) if said at least one predetermined criteria has not been met, repeating steps (c) through (f);

(h) if said at least one predetermined criteria has been met, establishing said control signal in said second state to place said switching device in said operative state; and (i) terminating said startup sequence.

10. A method for controlling startup of a precharged switching regulator apparatus as recited in claim 9 wherein said driver control device includes a monitor unit and a control unit; said monitor unit receiving an indication of said pulse signal from said pulse indicator device; said control unit cooperating with said monitor unit to generate said control signal according to whether said pulse signal satisfies said at least one predetermined criteria.

11. A method for controlling startup of a precharged switching regulator apparatus as recited in claim 9 wherein said driver control device is embodied in a digital electronic circuit.

12. A method for controlling startup of a precharged switching regulator apparatus as recited in claim 9 wherein said driver control device is embodied in a digital electronic circuit.

* * * * *